United States Patent Office 3,494,767

Patented Feb. 10, 1970

3,494,767

COPYING MATERIAL FOR USE IN THE PHOTOCHEMICAL PREPARATION OF PRINTING PLATES

Urbain Leopold Laridon and Gerard Albert Delzenne, Wilrijk-Antwerp, and Johan Lodewijk Verelst, Kontich, Belgium, assignors to Gevaert-Agfa N.V., Mortsel, Belgium, a Belgian company No Drawing. Filed Feb. 8, 1967, Ser. No. 614,543
Claims priority, application Great Britain, Feb. 28, 1966, 8,726/66
Int. Cl. G03f *7/02;* G03c *1/52;* C07c *113/00*
U.S. Cl. 96—33 12 Claims

ABSTRACT OF THE DISCLOSURE

Photomechanical process of making a printing plate wherein the following one-bis (O-quinone-diazide)-modified bisphenol is used in the light-sensitive coating:

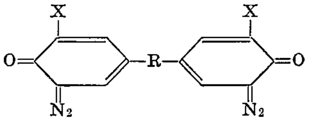

wherein:

R is a sulfone, a methylene group, or a cycloaliphatic group, and

X is hydrogen, halogen, nitro or an alkyl group of 1 to 4 carbon atoms.

This invention relates to light-sensitive compounds, and to the production of light-sensitive coatings for use in the manufacture of copying materials, more particularly of copying materials yielding positive images.

It is well known to produce so-called tanned images in a layer consisting of a colloid that is hardened by products produced by the action of light upon certain light-sensitive substances, which are homogeneously dispersed in that colloid. Among these light-sensitive substances are known salts of chromic acid, some diazo compounds, and the like. The colloids hardened by the action of light are capable of retaining greasy ink, or can be used for the photochemical production of printing plates. The printing plates obtained by these methods, however, are negative with respect to the master pattern, and further treatments are necessary to transform these negative printing images into images that are positive with respect to the master pattern.

We have found that a light-senstive system based on the phototransformation of a new class of compounds containing quinone diazide groups can be used for recording and reproducing optical information, yielding directly positive images or printing plates.

According to the invention a copying material for use in the photochemical preparation of printing plates is provided, which comprises a support having thereon a light-sensitive coating comprising at least one bis(O-quinone diazide) modified bisphenol having the formula:

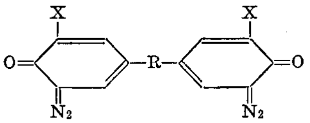

wherein:

R is a methylene group, an alkyl-substituted methylene group, a dialkyl-substituted methylene group, an aryl-substituted methylene group, a sulphone group or a cycloaliphatic group; and X is a hydrogen atom, a halogen atom, an alkyl group of 1 to 4 carbon atoms, or a nitro group.

In the above and the other formulae of this specification, the group "$=N_2$" is intended to cover the alternative forms of the diazide group, namely $$=\overset{+}{N}-\overset{-}{N} \quad \text{and} \quad -\overset{+}{N}\equiv N$$

In general a polymer is added to the light-sensitive layer, especially when it is intended to etch the images obtained on metallic supports, or when the images obtained are directly to be used as printing plates. For such uses the said polymer is preferably an alkali-soluble polymer. As alkali-soluble polymers may be used copolymers of unsaturated carboxylic acids, such as acrylic acid, methacrylic acid, crotonic acid, maleic acid, fumaric acid, itaconic acid and citraconic acid. If the copolymer comprises an unsaturated dicarboxylic acid, the half-esters and half-amides thereof may be used too. These unsaturated carboxylic acids are copolymerized with ethylenically unsaturated compounds which are substantially insoluble in an alkaline medium and present in the copolymer in such a proportion that the copolymer itself remains soluble in an alkaline medium. Ethylenically unsaturated compounds may be so used include styrene and its derivatives, vinyl chloride, vinylidene chloride, vinyl esters such as vinyl acetate, acrylic acid esters, methacrylic acid esters, acrylonitrile, methacrylonitrile, etc.

Preferred alkali-soluble polymers, however, are the so-called novolaks. According to British Standard 1755–1951 these are "soluble, fusible, synthetic resins produced from a phenol and an aldehyde, having no reactive groups (i.e. methylol groups) in the molecule and therefore incapable of condensing with other novolak molecules on heating without the addition of hardening agents."

The amount of alkali-soluble resin added to the light-sensitive coating may vary within wide limits, but in general at least one part by weight of alkali-soluble resin is present for every four parts by weight of compound or compounds containing quinone diazide groups.

The light-sensitive coating consists of one or more bis(O-quinone diazide) modified bisphenols and preferably of an alkali-soluble polymeric material. This coating may also comprise minor amounts of additives, which increase the light-sensitivity of the compounds containing quinone diazide groups.

Further, the light-sensitive coating may also comprise stabilizers, plasticizers, extenders, dyes and the like. The term "light-sensitive composition" in the accompanying description is to be understood to mean a composition comprising the light-sensitive compounds containing quinone diazide groups, and which may include alkali-soluble polymers and other additives.

The following are examples of the bis(O-quinone diazide) modified bisphenols, which are suitable for being incorporated into the copying material according to the invention:

bis(6-diazo-2,4-cyclohexadien-4-yl-1-on)-methane
bis(6-diazo-2,4-cyclohexadien-4-yl-1-on)-phenylmethane
bis(2-bromo-6-diazo-2,4-cyclohexadien-4-yl-1-on)-phenylmethane
bis(2-nitro-6-diazo-2,4-cyclohexadien-4-yl-1-on)-phenylmethane
2,2-bis(6-diazo-2,4-cyclohexadien-4-yl-1-on)-propane
2,2-bis(2-bromo-6-diazo-2,4-cyclohexadien-4-yl-1-on)-propane
2,2-bis(2-chloro-6-diazo-2,4-cyclohexadien-4-yl-1-on)-propane
2,2-bis(2-nitro-6-diazo-2,4-cyclohexadien-4-yl-1-on)-propane 2,2-bis(2-methyl-6-diazo-2,4-cyclohexadien-4-yl-1-on)-propane
bis(6-diazo-2,4-cyclohexadien-4-yl-1-on)-sulphone
bis(2-methyl-6-diazo-2,4-cyclohexadien-4-yl-1-on)-sulphone
bis(2-bromo-6-diazo-2,4-cyclohexadien-4-yl-1-on)-sulphone
1,1-bis(2-methyl-6-diazo-2,4-cyclohexadien-4-yl-1-on)-cyclohexane.

These and other bis(O-quinone diazide) modified bisphenols are new compounds per se and may be prepared by reaction of sodium nitrite with the corresponding diamino-bisphenol-chlorohydrate dissolved in water. The bromo- and chloro-derivatives are prepared by bromination or chlorination of the non-substituted bis(O-quinone diazides) with bromine or with sodium hypochlorite in aqueous hydrochloric acid.

In order to prepare a copying material in accordance with the invention a support is coated with a solution in an organic solvent or in a mixture of organic solvents of the bisphenol derivatives hereinbefore described, and which may include the alkali-soluble polymer. Metal supports, or supports coated with metals such as per example zinc, and especially aluminum, are excellently suited as support materials for a printing plate. It is not strictly necessary to subject the metal supports to be used to any preliminary chemical treatment in order to render their surfaces suitable for accepting the light-sensitive layer. A simple mechanical roughening of the metallic surface proves to be quite sufficient for the application of the light-sensitive layer, which firmly attaches itself to the metallic base in the form of a thin uniform film. For the production of planographic printing plates there can also be used, e.g., plates of stone or glass and also specially treated sheets of paper or plastic foils.

The base or support is coated by whirlcoating, brushing or spraying with a solution of the light-sensitive composition in a suitable solvent, or may be coated continuously on known coating machines, whereupon the solvent or solvent mixture is eliminated by known means such as evaporation, thus leaving a more or less thin coating of the light-sensitive composition upon the base or support. The thickness of the light-sensitive layer obtained may be from about 0.5 to 20$\mu$ and is preferably between 1 and 5$\mu$. The light-sensitive coating is then ready for exposure to actinic light rays. The light source should preferably furnish an effective amount of ultraviolet radiation. Suitable sources of light includes carbon arcs, xenon lamps, mercury vapour lamps, fluorescent lamps, argon glow lamps, photographic flood lamps and tungsten lamps.

The light-sensitive layer is exposed to actinic light through a contacted transparent master pattern consisting solely of opaque and transparent areas e.g. the so-called line or half-tone positive or negative wherein the opaque areas are of the same optical density. However, it is also possible to expose the light-sensitive layer to a projected image. During exposure it is considered that the light probably induces the photolytic transformation of the quinone diazide groups into alkali-soluble cyclopentadiene-carboxylic acid derivatives.

The development or removal of the coating in the exposed areas can be effected by means of water or an aqueous composition, preferably by means of an alkaline aqueous solution rapidly dissolving the image-wise cyclopentadiene-carboxylic acids which are probably formed. An alkaline developer which may conveniently be used is an aqueous solution of a phosphate of an alkaline metal such as sodium phosphate.

In the non-exposed portions of the printing plate the presence of the unconverted compounds containing quinone-diazide groups renders the light-sensitive layer insoluble in alkaline medium, even if an alkali-soluble polymer such as a novolak is present. Accordingly, the unexposed parts of a layer remain to form a positive image of the master pattern. These positive images can be used as printing plates, such as for planographic and offset printing. They may also be subjected to an etching process which make them suitable for intaglio or relief printing.

After removal of the exposed areas of the light-sensitive layer by the developing solution, the ink-repellency of the unshielded areas of the base material can be improved by an after-treatment with a lithographic preparation for hydrophilizing or enhancing the hydrophility of said areas. Compounds and compositions suited for that purpose are described, e.g., in United Kingdom patent specification 946,538, filed Jan. 19, 1959 by Gevaert Photo-Producten N.V.

The ink-receptivity of the hydrophobic non-exposed areas can be improved by treating the developed printing plate with a lacquer, which adheres to the hydrophobic areas and forms an oleophilic deposit thereon. Suitable lacquers and the method of applying them are described in United Kingdom patent specification 968,706, filed June 2, 1961 and Belgian patent specification 631,790, filed May 2, 1963 both by Gevaert Photo-Producten N.V.

In order to prepare a printing form for gravure printing an exposure and etching technique is used whereby in the base material according to a screen pattern cells can be formed for receiving the printing ink.

Base materials suited for etching are well known. More particularly are mentioned base materials, which substantially consists of zinc, copper, steel or an etchable magnesium alloy.

In order to prepare a planographic printing plate a base material is chosen suited for lithographic printing, preferably a zinc sheet.

A special advantage of the use of the compounds containing quinone diazide groups according to the invention is the easy way in which these products can be synthetized, starting from inexpensive raw materials. Further, the solubility of the light-sensitive system and also the solvent, which will be used to "develop" the photographic image, can be adapted to the final destination of the photochemically modified polymeric material. A still further advantage of the present light-sensitive compositions is that they can be prepared a considerable time before use.

EXAMPLE 1

5.16 g. (0.02 mole) of 2,2-bis(3-amino-4-hydroxyphenyl)-propane, 50 ccs. of water and 4 ccs. of strong hydrochloric acid are brought into a 250 ccs. flask provided with a stirrer, a dropping funnel, a thermometer and a condensor. Whilst stirring and cooling at 0–5° C., a solution of 2.8 g. (0.04 mole) of sodium nitrite in 10 ccs. of water is dropwise added, whereafter stirring is continued for 1 h. at room temperature. The reaction mixture is then filtered and the filtrate is salted out with sodium chloride. A red product precipitates, which is sucked off and dried under vacuum. The product obtained is 2,2-bis(6-diazo-2,4-cyclohexadien-4-yl-1-on)-propane of the formula:

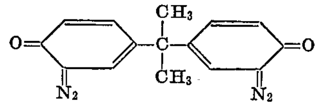

50 mg. of this product together with 50 mg. of novolak are dissolved in a mixture of 3 ccs. of glycol ethyl ether and 2 ccs. of acetone. From this solution a coating is applied onto an aluminum foil in such a way that after removal of the solvents the thickness of the coating is approximately 2$\mu$. This layer is exposed through a line transparency with an 80 watt mercury vapour lamp at a distance of 15 cm. Thereafter, the layer is developed with a solution of 5 g. of sodium phosphate-12-water and 15 g. of sodium chloride in 100 ccs. of water. Thereby the exposed areas of the layer are washed away. After development, the unshielded aluminum on the exposed areas is rendered more hydrophilic by means of a 1% phosphoric acid solution, whereafter the printing plate is inked.

In order to obtain a good positive printing plate an exposure for 1 minute with an 80 watt mercury vapour lamp suffices, whereas with a 300 watt tungsten lamp an exposure time of 4 minutes is required.

In the light-sensitive layer as described above, the novolak can be replaced by another alkali-soluble polymer, e.g. by a copolymer of maleic anhydride and styrene, or a copolymer of maleic anhydride and ethylene.

EXAMPLE 2

5.72 g. (0.02 mole) of 2,2-bis(3-methyl-5-amino-4-hydroxyphenyl)-propane, 50 ccs. of water and 4 ccs. of strong hydrochloric acid are brought into a 250 ccs. flask provided with a stirrer, a dropping funnel, a thermometer and a condensor. Whilst stirring and cooling to 0–5° C., a solution of 2.8 g. (0.04 mole) of sodium nitrite in 10 ccs. of water is dropwise added, whereafter stirring is continued for 1 h. at room temperature. The product precipitates as a red powder, which is sucked off and dried in vacuo and showed to be 2,2-bis(2-methyl-6-diazo-2,4-cyclohexadien-4-yl-1-on)-propane of the formula:

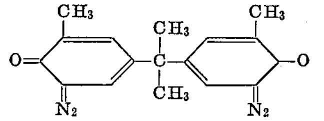

As in Example 1, 50 mg. of this product together with 50 mg. of novolak are dissolved in a mixture of 3 ccs. of glycol ethyl ether and 2 ccs. of acetone, and from this solution a layer of 2μ thickness is applied to an aluminium foil. Exposure, development and after-treatment of the obtained original are carried out as in Example 1. An exposure time of 30 seconds with an 80 watt mercury vapour lamp suffices in order to obtain a good image.

EXAMPLE 3

The processes of Examples 1 and 2 are repeated but by starting from the following bisphenols:

(1) bis(3-amino-4-hydroxyphenyl)-phenylmethane
(2) 1,1-bis(3-methyl-4-hydroxy-5-aminophenyl)-cyclohexane
(3) bis(3-bromo-4-hydroxy-5-aminophenyl)-phenylmethane
(4) 2,2-bis(3-nitro-4-hydroxy-5-aminophenyl)-propane.

Hereby are respectively obtained the following compounds containing quinone diazide groups:

(1) bis(6-diazo-2,4-cyclohexadien-4-yl-1-on)-phenylmethane
(2) 1,1-bis(2-methyl-6-diazo-2,4-cyclohexadien-4-yl-1-on)-cyclohexane
(3) bis(2-bromo-6-diazo-2,4-cyclohexadien-4-yl-1-on)-phenylmethane
(4) 2,2-bis(2-nitro-6-diazo-2,4-cyclohexadien-4-yl-1-on)-propane.

For coating of the light-sensitive layer, exposure to light and development, one proceeds as in Example 1. The required exposure times are given in the following table:

| Light-sensitive compound (see list above) | Exposure time required — With 80 w. mercury vapour lamp | With 300 w. tungsten lamp |
|---|---|---|
| (1) | 45'' | |
| (2) | 20'' | 1' |
| (3) | 3' | |
| (4) | 2' | |

EXAMPLE 4

By brominating the quinone diazide of bis(3-amino-4-hydroxyphenyl)-sulphone in water in the presence of hydrochloric acid there is obtained bis(2-bromo-6-diazo-2,4-cyclohexadien-4-yl-1-on)-sulphone of the formula:

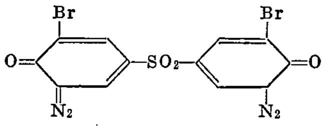

90 g. of the above compound containing quinone diazide groups and 18 g. of novolak are dissolved in a mixture of 500 ccs. of methyl ethyl ketone and 500 ccs. of methyl glycol. From this solution a layer is applied onto a zinc support in such a way that after evaporation of the solvents a layer of approximately 2μ thick remains. This layer is exposed through a contacted line transparency to an 80 watt mercury vapour lamp or a 300 watt tungsten lamp placed at a distance of 15 cm.

The exposed layer is developed with a 3% aqueous solution of sodium phosphate to which 15% of sodium chloride has been added. The exposed parts of the layer are dissolved away, whereas the non-exposed parts remain on the support as a positive relief image of the original line transparency.

The relief is rubbed with an aqueous fixing solution containing 4% of potassium hexacyanoferrate (II), 20% of gum arabic and 1% of phosphoric acid.

A hydrophobic lacquer, e.g. of the class of those described in United Kingdom patent specification 968,706, filed June 2, 1961 and Belgian patent specification 631,790, filed May 2, 1963, both by Gevaert Photo-Producten N.V., is applied to the remaining parts of the light-sensitive layer whereby these parts are reinforced. In this way a planographic printing plate is obtained having a great wear-resistance of the image which fact enables the printing of a high number of copies.

The unshielded parts of the zinc support which were bared during development by dissolving away the exposed parts of the light-sensitive layer may also be subjected to an etching process whereby the remaining parts of the light-sensitive layer serve as the etching resist. As etching solution is used a 10% aqueous solution of nitric acid, which produces a plate suitable for letterpress printing.

EXAMPLE 5

By starting from 2,2-bis(3-nitro-5-amino-4-hydroxyphenyl)-propane and following the method of diazotation described in Examples 1 and 2, 2,2-bis(2-nitro-6-diazo-2,4-cyclohexadien-4-yl-1-on)-propane of the following formula is obtained:

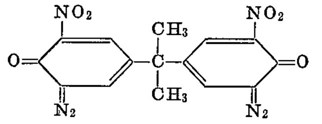

As in Example 4 this compound containing quinone diazide groups is mixed with novolak and their solution in a 1:1 mixture of methyl ethyl ketone and methyl glycol is applied to a copper plate in such a way that a layer of approximately 2μ thickness remains. After exposure to light with an 80 watt mercury vapour lamp for 1 minute, or with a 300 watt tungsten lamp for 4 minutes through a contacted line transparency, development occurs as in Example 4. Then the unshielded parts of the copper plate are etched with a 32% aqueous solution of iron (III) chloride. An excellent positive relief printing plate is obtained.

EXAMPLE 6

The following list of light-sensitive compounds containing quinone diazide groups is tested:

(1) bis(6-diazo-2,4-cyclohexadien-4-yl-1-on)-sulphone
(2) bis(2-nitro-6-diazo-2,4-cyclohexadien-4-yl-1-on)-phenylmethane
(3) 2,2-bis(2-chloro-6-diazo-2,4-cyclohexadien-4-yl-1-on)-propane (4) 2,2-bis(2-bromo-6-diazo-2,4-cyclohexadien-4-yl-1-on)-propane-dibromohydrate (5) 2,2-bis(2-bromo-6-diazo-2,4-cyclohexadien-4-yl-1-on)-propane.

Compound (1) is manufactured by following the diazotation method described in Examples 1 and 2 by starting from the corresponding bisphenol, which is bis(3-amino-4-hydroxyphenyl)-sulphone.

Compound (2) results from the diazotation of bis(3-nitro-4-hydroxy-5-aminophenyl)-phenylmethane dihydrochloride and compound (3) is obtained by the chlorination of 2,2-bis(6-diazo - 2,4 - cyclohexadien-4-yl-1-on)-propane in water with sodium hypochlorite in the presence of hydrochloric acid.

Bromination of 2,2-bis(6-diazo-2,4-cyclohexadien-4-yl-1-on)-propane in water in the presence of hydrochloric acid yields compound (4), whereas compound (5) results from the treatment of compound (4) with sodium carbonate in alcohol.

All the above compounds containing quinone diazide groups are applied as in Examples 1 and 2 to a support, exposed to light and developed in a solution of 5 g. sodium phosphate and 15 g. of sodium chloride in 100 ccs. of water. The sole exception is compound (1) that is developed in a solution of 10 g. of sodium carbonate and 5 g. of sodium chloride in 100 ccs. of water. The required exposure times for obtaining good positive relief images are given in the following table:

| Light-sensitive compound (see list above) | Exposure time required: With 80 w. mercury vapour lamp | Exposure time required: With 300 w. tungsten lamp |
|---|---|---|
| (1) | 3′ | 7′ |
| (2) | 2′ | 6′ |
| (3) | 4′ | 8′ |
| (4) | 2′ | 6′ |
| (5) | 2′ | 6′ |

We claim:

1. A process for the photochemical preparation of a printing plate, which comprises exposing to actinic light under a master pattern a copying material which comprises a support having thereon a light-sensitive coating containing at least one bis(O-quinone diazide)-modified bisphenol having the formula:

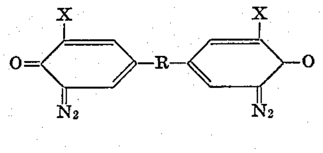

wherein:

R is sulphone, a methylene group, or a cycloaliphatic group, and

X is hydrogen, halogen, nitro, or an alkyl group of 1 to 4 carbon atoms, and developing the resulting positive image of the master pattern by dissolving the exposed portions of the coating in an aqueous alkaline liquid.

2. A process as outlined in claim 1, wherein the developer is an aqueous solution of sodium phosphate and of sodium chloride.

3. A process as outlined in claim 1, including the step of etching the developed plate in order to produce a positive relief printing plate.

4. Copying material for use in the photochemical preparation of printing plates, which comprises a support having thereon a light-sensitive coating comprising at least one bis(O-quinone-diazide)modified bisphenol, having the formula:

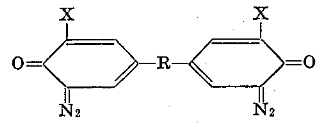

wherein:

R is sulphone, a methylene group, or a cycloaliphatic group, and

X is hydrogen, halogen, nitro, or an alkyl group of 1 to 4 carbon atoms.

5. Copying material according to claim 4, wherein the light-sensitive coating comprises also an alkali-soluble polymer.

6. Copying material according to claim 5, wherein at least one part by weight of alkali-soluble polymer is present for every four parts by weight of the bis(O-quinone diazide)-bisphenol.

7. Copying material according to claim 5, wherein the alkali-soluble polymer is a novolak resin.

8. Copying material according to claim 4, wherein the bis(O-quinone diazide)-modified bisphenol is bis(6-diazo-2,4-cyclohexadien-4-yl-1-on)-phenylmethane.

9. Copying material according to claim 4, wherein the bis(O-quinone-diazide)-modified bisphenol is 2,2-bis(2-methyl-6-diazo-2,4-cyclohexadien-4-yl-1-on)-propane.

10. Copying material according to claim 4, wherein the bis(O-quinone diazide)-modified bisphenol is bis(3-bromo-6-diazo-2,4-cyclohexadien-4-yl-1-on)-sulphone 11. Copying material according to claim 4, wherein the bis(O-quinone diazide)-modified bisphenol is 1,1-bis(2-methyl-6-diazo-2,4-cyclohexadien-4-yl-1-on)-cyclohexane.

12. A bis(6-quinone diazide)-modified bisphenol having the formula:

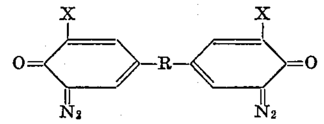

wherein:

R is sulphone, a methylene group, or a cycloaliphatic group, and

X is hydrogen, halogen, nitro, or an alkyl group of 1 to 4 carbon atoms.

References Cited

UNITED STATES PATENTS

| | | | |
|---|---|---|---|
| 2,083,285 | 6/1937 | Alink | 96—91 XR |
| 3,046,119 | 7/1962 | Sus. | |
| 3,046,122 | 7/1962 | Sus. | |
| 3,126,281 | 3/1964 | Sus et al. | |
| 3,130,049 | 4/1964 | Neugebauer et al. | |

FOREIGN PATENTS

| | | |
|---|---|---|
| 711,808 | 7/1954 | Great Britain. |
| 722,844 | 2/1955 | Great Britain. |

OTHER REFERENCES

Chem. Abstracts, vol. 64, p. 835f, 1966.

PB25781 and PB44231, pp. 615, 616, 1701, 1947.

NORMAN G. TORCHIN, Primary Examiner

C. BOWERS, Assistant Examiner

U.S. Cl. X.R.

96—91, 75; 260—141